United States Patent Office 3,578,683
Patented May 11, 1971

3,578,683
1,4-DISUBSTITUTED-1-HYDROXY-2,2,3-TRICYANO-1,2-DIHYDROXANTHONES
Myrna Loy, Philadelphia, Pa., and Kenneth Robert Huffman and Edwin Fisher Ullman, Stamford, Conn., assignors to American Cyanamid Company, Stamford, Conn.
No Drawing. Original application Dec. 14, 1964, Ser. No. 418,337. Divided and this application Nov. 2, 1967, Ser. No. 703,491
Int. Cl. C07d 7/44
U.S. Cl. 260—335                                       5 Claims

ABSTRACT OF THE DISCLOSURE

Cyclohexadiene compounds, of which the following is exemplary.

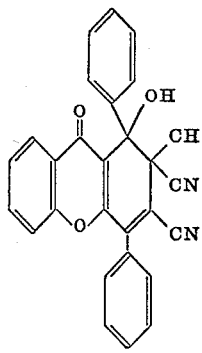

These compounds are photochromic and may be used in information display or recording, and in other optical applications such as light filtering.

---

This application is a division of application Ser. No. 418,337, filed Dec. 14, 1964, now abandoned.

This invention relates to novel photochromic compounds and to syntheses thereof. More paticularly, the present invention relates to cyclohexadienes of the formula:

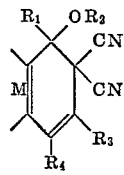

wherein $R_1$ and $R_4$ are selected from the group consisting of phenyl and substituted phenyl, said substituents for phenyl being selected from the group consisting of hydroxy, lower alkyl, lower alkoxy, lower alkyl thio, cyano, nitro, di(lower alkyl)amino, halogen and trifluoromethyl; $R_2$ is selected from the group consisting of hydrogen, lower alkanoyl, and benzoyl; $R_3$ is selected from the group consisting of hydrogen, cyano, phenyl and lower alkyl; and M is selected from the group consisting of

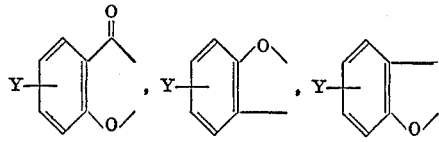

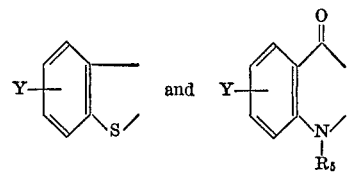

wherein Y is selected from the group consisting of hydrogen, hydroxy, lower alkyl, trifluoromethyl, lower alkoxy, lower alkyl thio, cyano, nitro, halogen, di(lower alkyl)amino, phenyl and lower alkyl-substituted phenyl; and $R_5$ is selected from the group consisting of lower alkyl and phenyl-substituted lower alkyl. Each of the structures for M is in the completed compound, of course, fused with the hexagonal ring represented in the general formula above.

The starting material for preparation of compounds defined by the foregoing formula is a compound of the general formula:

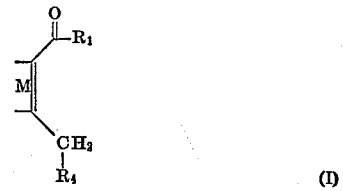

(I)

wherein $R_1$, $R_4$ and M have the values defined above.

Numerous members of the group defined by starting compound (I) above are disclosed as novel compounds in copending applications of one or more of the present inventors. These copending cases also disclose methods for preparing the instant starting materials. For the sake of clarity and completeness the following is presented as a partial indication of the compounds and methods of preparation disclosed in said copending cases, the full subject matter of which is incorporated herein by reference.

(1) Ser. No. 377,394. Filed June 23, 1964. See U.S. Pat. No. 3,331,859.

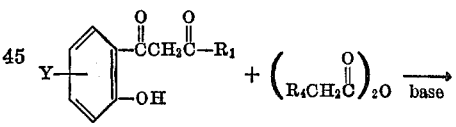

(2) Ser. No. 418,294. Filed Dec. 14, 1964, U.S. Pat. No. 3,321,459.

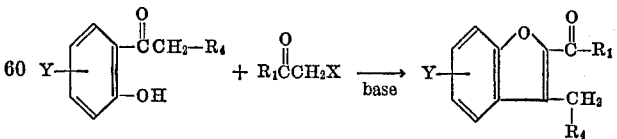

(3) Ser. No. 418,336. Filed Dec. 14, 1964, U.S. Pat. No. 3,331,854.

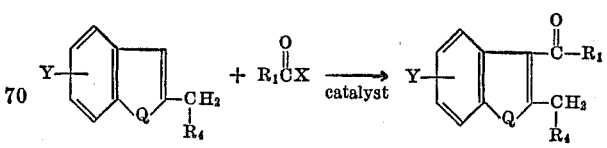

(4) Ser. No. 418,295. Filed Dec. 14, 1964, now abandoned and refiled as Ser. No. 739,136 on June 24, 1968.

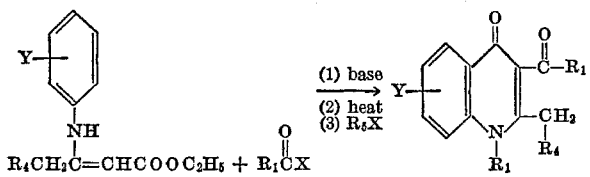

In each of the above preparations $R_1$, $R_4$, $R_5$ and Y have the values given above with respect to the general formula of the compounds of the present invention; Q is an oxygen or sulfur atom; and X is a leaving group such as halogen, e.g., bromine or chlorine. In reaction (1), Y is identical with A of the copending case indicated.

The compounds of the present invention may be prepared by several routes beginning with starting compound (I) as set forth in the following schematic:

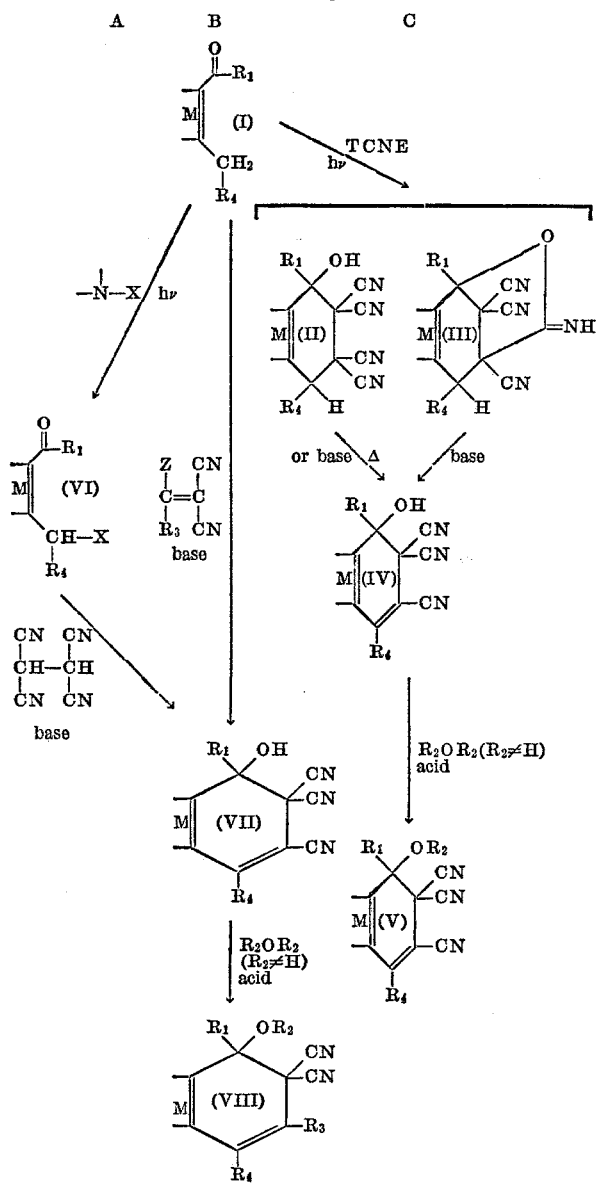

It will be seen from the schematic that at least three routes designated by A, B, and C are available. Each of said routes is discussed hereinafter.

SYNTHESIS A

Starting compound (I) is dissolved in an inert solvent such as benzene, chloroform, carbon tetrachloride, acetonitrile and the like including mixtures thereof. To this solution there is added N-halo-succinimide or N-halo-acetamide, wherein the halo group (X) is bromine or chlorine. The mixture is then reacted at reflux for from about 30 minutes to 10 hours, the exact reaction time depending upon reactants and temperature. The reaction is preferably conducted under irradiation with ultraviolet light. On completion of reaction, compound (VI) is separated by conventional means such as filtering, fractional crystallization and the like. Thereafter tetracyanoethane is mixed with two molar equivalents of a base such as sodium hydride, potassium tertiarylbutoxide, sodium methoxide, lithium diethylamide or the like, and the mixture dissolved with (VI) in a suitable solvent such as tetrahydrofuran, dioxane, ethers such as diethyl ether, aromatic hydrocarbons such as benzene and toluene, and other like solvents. The mixture is stirred and reacted preferably with mild heating for from about 20 minutes to 5 hours. Compound (VII) is then separated as the reaction product by conventional means such as filtration, fractional crystallization and the like.

Product (VII) is itself a useful photochromic compound.

Product (VIII) may be prepared by dissolving (VII) in an acylating agent such as an organic acid anhydride defined by $R_2OR_2$ and reacting for a time and at a temperature, (e.g., from about 30° C. to 150° C.) sufficient to form (VIII). Nonlimiting examples of suitable anhydrides are acetic and propionic anhydride and also benzoic anhydride dissolved in a suitable solvent. The reaction is preferably conducted in the presence of an acid catalyst such as sulfuric acid, phosphoric acid, hydrochloric acid, fluoroboric acid, paratoluene sulfonic acid or other organic or mineral acids as well as mixtures thereof. Small amounts of the acid (e.g., 0.0001% to 0.1% by weight) in the reaction mixture will generally be sufficient. It will be obvious that $R_2OR_2$, when $R_2$ has the values defined above except hydrogen, defines an acylating agent whereby there is prepared the acylated form of (VII). When $R_2$ is hydrogen, $R_2OR_2$ is water and the product will be compound (VII).

SYNTHESIS B

To a solution of starting compound (I) in a suitable solvent there is added a strong base and the resultant mixture is stirred for several minutes at from about 15° C. to 100° C. Suitable solvents for the strong base and starting compound (I) are tetrahydrofuran, dioxane, dimethylsulfoxide, 1,2-dimethoxyethane (glyme), tertiarybutyl alcohol and the like, including mixtures of two or more. The function of the strong base is to remove a proton from starting compound (I) thereby forming the anionic conjugate base of compound (I).

To this mixture there is added a cyanoethylene compound of the formula

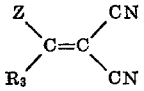

wherein Z defines a "leaving" group, i.e., a group which does not take part in the formation of product (VII). Such groups would include lower alkoxy such as ethoxy and propenoxy, phenoxy, halogen, cyano, sulfonoxy

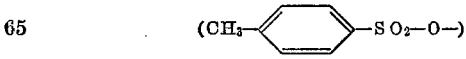

and the like. $R_3$ will have any of the values defined for $R_3$ hereinabove and it will be noted that said group is introduced by the cyanoethylene reactant. Suitable strong bases include sodium hydride; sodium triphenylmethide; alkali metal alkoxides such as sodium ethoxide and potassium butoxide; alkali metal dialkyl amides such as lithium diethylamide and lithium dipropylamide; and the like. The mixture of compound (I), cyanoethylene compound, strong base and solvent is heated at reflux for from about 20 minutes to 5 hours. The product is separated by conventional means such as evaporating off the solvent, dissolving the residue in water and acidifying with a mineral acid, and then collecting the product by filtration or by extraction with a suitable organic solvent, said extractant thereafter being evaporated. Product (VIII) is prepared from product (VII) in substantially the same manner as given above for synthesis A.

SYNTHESIS C

Starting compound (I) is dissolved in a suitable solvent, e.g., ethylacetate, tetrahydrofuran, acetonitrile, acetone or the like. To this mixture there is added a molar equivalent or molar excess of tetracyanoethylene. The reaction vessel is provided with a nitrogen atmosphere and the mixture is irradiated with ultraviolet light, or wave lengths of light for which the particular compounds employed exhibit maximum absorption, for from about 6 to 24 hours depending upon the reactants chosen and the arrangement of the irradiation apparatus, e.g., the distance from the light source and the intensity of the light. Products (II) and (III) are formed by this procedure and are separated by conventional means such as fractional crystallization and the like.

Each of products (II) and (III) may then be separately dissolved in an inert solvent such as ethanol and treated with base at from about 10° C. to 100° C. for from about 30 minutes to 24 hours to obtain (IV). Any bases which are soluble in the reaction mixture may be employed, for example, tri-(lower alkyl)amines such as triethylamine and tributylamine; alkali metal, ammonium, tri(lower alkyl)ammonium or tetra(lower alkyl)ammonium salts of carboxylic acids such as acetic acid and propionic acid; alkoxides such as sodiumalkoxide, sodium phenoxide; pyridine and the like. At least one molar equivalent of base is required and preferably a molar excess. The end point of reaction will be evident by change in color. It will also be apparent that compounds (II) and (III) may be transformed by a base to provide (IV). Alternatively, when compounds (II) and (III) have been separated, compound (II) may simply be heated at from about 30° C. to 100° C. for from about 30 minutes to 24 hours to form (IV) since no base is required in this case. As a further alternative, the reaction mixture containing (II) and (III) may be heated under the same conditions to form (IV), (III) being unaffected but not inhibiting the photochromic properties of (IV). If desired, (III) may also be separated thereafter from (IV).

Product (IV) is isolated by conventional means such as by evaporation of the solvent and distillation of the residue or by fractional crystallization.

Product (V) is prepared from (IV) in substantially the same manner as given above in synthesis B for the preparation of (VIII) from (VII). However, it will be noted that (V) contains three cyano groups, whereas (VII) and (VIII) may contain only two cyano groups. Both (IV) and (V) are useful photochromic compounds.

Any of the procedures defined above may be run at atmospheric, subatmospheric or superatmospheric pressure. Likewise, the procedures may be batch, semi-continuous or continuous and the sequence of addition of the reactants to one another is not critical.

The following tabulation of specific compounds, where M of the general Formulas IV, V, or VIII is

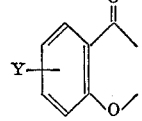

is presented to illustrate but not to impose any limitation on the scope of the novel class of compounds of this invention. It will at once be obvious from the tabulation that other compounds wherein M, Y, $R_1$, $R_2$, $R_3$, $R_4$ and $R_5$ have any of the values specified above may be prepared according to the generalized procedures also described above. It will also be apparent that Y may be attached to any available carbon atom in the six carbon atomhexagonal portion of M.

While all of the compounds of the present invention exhibit photochromic activity, some are more photochromic and have greater stability under given conditions than others. The choice of specific compounds of the disclosed class will therefore obviously depend on the environment of use, economy of preparation and like criteria, all of which factors are routine considerations when utilizing the compounds of this invention.

For a clear understanding of the structure represented by the tabulation, the following sub-generic member is set forth wherein numbered positions 5 to 8 identify positions given for Y in the table. Y will be attached to corresponding carbon atoms in other sub-generic (M) structures although the numbering may differ.

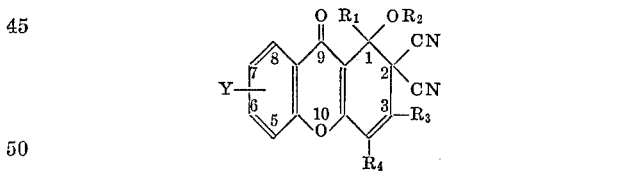

TABLE I

| Number: | $R_1$ | $R_2$ | $R_3$ | $R_4$ | Y |
|---|---|---|---|---|---|
| 1 | $C_6H_5$ | H | CN | $C_6H_5$ | H |
| 2 | p-$C_6H_4OCH_3$ | H | CN | Same as above | H |
| 3 | p-$C_6H_4CN$ | H | CN | ----do---- | H |
| 4 | p-$C_6H_4N(CH_3)_2$ | H | CN | ----do---- | H |
| 5 | p-$C_6H_4NO_2$ | H | CN | ----do---- | H |
| 6 | o-$C_6H_4OH$ | H | CN | ----do---- | H |
| 7 | $C_6H_5$ | H | CN | p-$C_6H_4OCH_3$ | H |
| 8 | Same as above | H | CN | p-$C_6H_4CN$ | H |
| 9 | ----do---- | H | CN | p-$C_6H_4N(CH_3)_2$ | H |
| 10 | ----do---- | H | CN | p-$C_6H_4NO_2$ | H |
| 11 | ----do---- | H | CN | p-$C_6H_4OH$ | H |
| 12 | o-$C_6H_4C_2H_5$ | H | CN | p-$C_6H_4SCH_3$ | H |
| 13 | o-$C_6H_4Cl$ | H | CN | p-$C_6H_4OH$ | H |
| 14 | m-$C_6H_4OCH_3$ | H | CN | m-$C_6H_4N(C_4H_9)_2$ | H |
| 15 | m-$C_6H_4C_3H_7$ | H | CN | o-$C_6H_4Br$ | H |
| 16 | m-$C_6H_4CF_3$ | H | CN | m-$C_6H_4F$ | H |
| 17 | o-$C_6H_4CN$ | H | CN | o-$C_6H_4N(CH_3)_2$ | H |
| 18 | p-$C_6H_4NO_2$ | H | CN | p-$C_6H_4N(CH_3)_2$ | H |
| 19 | $C_6H_5$ | H | CN | $C_6H_5$ | 8-$N(CH_3)_2$ |
| 20 | Same as above | H | CN | Same as above | 6-$N(CH_3)_2$ |
| 21 | ----do---- | H | CN | ----do---- | 6-CN |
| 22 | ----do---- | H | CN | ----do---- | 8-OH |
| 23 | ----do---- | H | CN | ----do---- | 8-$NO_2$ |
| 24 | p-$C_6H_4NO_2$ | H | CN | ----do---- | Same. |
| 25 | p-$C_6H_4OCH_3$ | H | CN | ----do---- | 6-$N(CH_3)_2$ |
| 26 | p-$C_6H_4CN$ | H | CN | ----do---- | 6-CN |
| 27 | p-$C_6H_4N(CH_3)_2$ | H | CN | ----do---- | 8-OH |
| 28 | p-$C_6H_4OH$ | H | CN | ----do---- | 8-$NO_2$ |
| 29 | $C_6H_5$ | H | CN | p-$C_6H_4OCH_3$ | 8-OH |
| 30 | Same as above | H | CN | o-$C_6H_4OH$ | 6-CN |

TABLE I.—Continued

| | R₁ | R₂ | R₃ | R₄ | Y |
|---|---|---|---|---|---|
| 31 | do | H | CN | o-C₆H₄NO₂ | 6-N(CH₃)₂ |
| 32 | do | H | CN | p-C₆H₄N(CH₃)₂ | 8-N(CH₃)₂ |
| 33 | do | H | CN | p-C₆H₄CN | 8-CN |
| 34 | o-C₆H₄C₂H₃ | H | CN | m-C₆H₄F | 6-OCH₃ |
| 35 | m-C₆H₄Cl | H | CN | o-C₆H₄Br | 7-CF₃ |
| 36 | p-C₆H₄OCH₃ | H | CN | m-C₆H₄N(CH₃)₂ | 5-Cl |
| 37 | o-C₆H₄CF₃ | H | CN | p-C₆H₅SCH₃ | 7-Br |
| 38 | p-C₆H₄NO₂ | H | CN | m-C₆H₄CN | 5-C₂H₃ |
| 39 | p-C₆H₄CN | H | CN | p-C₆H₄N(C₂H₅)₂ | 7-C₄H₉ |
| 40 | m-C₆H₄F | H | CN | o-C₆H₄CF₃ | 6-SCH₃ |
| 41 | C₆H₃ | COCH₃ | CN | C₆H₃ | H |
| 42 | p-C₆H₄OCH₃ | Same | CN | Same as above | H |
| 43 | p-C₆H₄CN | do | CN | do | H |
| 44 | o-C₆H₄N(CH₃)₂ | do | CN | do | H |
| 45 | p-C₆H₄NO₂ | do | CN | do | H |
| 46 | o-C₆H₄OH | do | CN | do | H |
| 47 | C₆H₃ | do | CN | p-C₆H₄OCH₃ | H |
| 48 | Same as above | do | CN | p-C₆H₄CN | H |
| 49 | do | do | CN | p-C₆H₄N(CH₃)₂ | H |
| 50 | do | do | CN | p-C₆H₄NO₂ | H |
| 51 | do | do | CN | p-C₆H₄OH | H |
| 52 | do | do | CN | C₆H₃ | 6-N(CH₃)₂ |
| 53 | do | do | CN | Same as above | 8-N(CH₃)₂ |
| 54 | do | do | H | do | H |
| 55 | p-C₆H₄OCH₃ | do | H | do | H |
| 56 | p-C₆H₄-CN | do | H | do | H |
| 57 | p-C₆H₄N(CH₃)₂ | do | H | do | H |
| 58 | p-C₆H₄NO₂ | do | H | do | H |
| 59 | p-C₆H₄OH | do | H | do | H |
| 60 | C₆H₃ | do | H | o-C₆H₄OH | H |
| 61 | Same as above | do | H | p-C₆H₄NO₂ | H |
| 62 | do | do | H | p-C₆H₄N(CH₃)₂ | H |
| 63 | do | do | H | p-C₆H₄CN | H |
| 64 | do | do | H | p-C₆H₄OCH₃ | H |
| 65 | do | do | H | C₆H₃ | 6-N(CH₃)₂ |
| 66 | do | do | H | Same as above | 6-CN |
| 67 | do | do | H | do | 8-OH |
| 68 | do | do | H | do | 8-NO₂ |
| 69 | o-C₆H₄CH₃ | H | CN | do | H |
| 70 | C₆H₃ | H | H | do | p-C₆H₄CH₃ |
| 71 | Same as above | COCH₃ | H | m-C₆H₄C₂H₃ | H₃ |
| 72 | do | Same | m-C₆H₄C₃H₇ | C₆H₅ | H |
| 73 | do | COC₂H₅ | o-C₆H₄CH₃ | m-C₆H₄NO₂ | o-C₆H₄C₂H₅ |
| 74 | do | COC₆H₅ | p-C₆H₄C₄H₉ | C₆H₃ | m-C₆H₄C₃H₇ |
| 75 | m-C₆H₄NO₂ | COCH₃ | CN | Same as above | o-C₆H₄CH₃ |
| 76 | o-C₆H₄OCH₃ | H | o-C₆H₄C₂H₃ | do | H |
| 77 | p-C₆H₄Cl | COC₃H₇ | H | do | p-C₆H₄C₄H₉ |
| 78 | C₆H₅ | COCH₃ | CN | do | 6-CN |
| 79 | Same as above | Same | CN | do | 8-OH |
| 80 | do | do | CN | do | 8-NO₂ |
| 81 | m-C₆H₄C₂H₃ | COC₂H₅ | CN | m-C₆H₄CF₃ | 8-SCH₃ |
| 82 | p-C₆H₄Cl | COC₆H₅ | CN | o-C₆H₄N(C₂H₅)₂ | 7-C₃H₇ |
| 83 | m-C₆H₄OCH₃ | COC₃H₇ | CN | p-C₆H₄CN | 6-OCH₃ |
| 84 | p-C₆H₄CF₃ | COC₃H₁₁ | CN | o-C₆H₄SCH₃ | 8-CN |
| 85 | m-C₆H₄NO₂ | COC₂H₅ | CN | m-C₆H₄Br | 6-N(CH₃)₂ |
| 86 | p-C₆H₄CN | COC₃H₇ | CN | p-C₆H₄Cl | 8-OH |
| 87 | o-C₆H₄F | COC₆H₅ | CN | o-C₆H₄F | 5-Cl |
| 88 | C₆H₃ | H | H | C₆H₃ | H |
| 89 | p-C₆H₄OCH₃ | H | H | Same as above | H |
| 90 | p-C₆H₄CN | H | H | do | H |
| 91 | p-C₆H₄N(CH₃)₂ | H | H | do | H |
| 92 | p-C₆H₄NO₂ | H | H | do | H |
| 93 | p-C₆H₄OH | H | H | do | H |
| 94 | C₆H₃ | H | H | o-C₆H₄OH | H |
| 95 | Same as above | H | H | p-C₆H₄NO₂ | H |
| 96 | do | H | H | p-C₆H₄N(CH₃)₂ | H |
| 97 | do | H | H | p-C₆H₄CN | H |
| 98 | do | H | H | p-C₆H₄OCH₃ | H |
| 99 | do | H | H | C₆H₃ | 6-N(CH₃)₂ |
| 100 | do | H | H | Same as above | 6-CN |
| 101 | do | H | H | do | 8-OH |
| 102 | do | H | H | do | 8-NO₂ |
| 103 | m-C₆H₄NO₂ | COCH₃ | H | m-C₆H₃CN | 8-CN |
| 104 | o-C₆H₄CN | Same | H | p-C₆H₄F | 6-OH |
| 105 | o-C₆H₄OCH₃ | COC₂H₅ | CH₃ | m-C₆H₄Br | 8-NO₂ |
| 106 | m-C₆H₄OH | COC₃H₇ | Same | o-C₆H₄F | 7-SCH₃ |
| 107 | p-C₆H₄SCH₃ | COC₆H₅ | C₂H₅ | p-C₆H₄CF₃ | 7-C₃H₇ |
| 108 | p-C₆H₄CF₃ | COCH₃ | Same | p-C₆H₄SCH₃ | 6-OCH₃ |
| 109 | o-C₆H₄F | Same | C₄H₉ | m-C₆H₄OH | 7-CF₃ |
| 110 | m-C₆H₄Br | COC₄H₉ | C₆H₅ | o-C₆H₄OCH₃ | 6-Br |
| 111 | p-C₆H₄Cl | COCH₃ | Same | o-C₆H₄CN | 5-OCH₃ |
| 112 | m-C₆H₄CN | Same | p-C₆H₅CH₃ | m-C₆H₄NO₂ | 5-N(CH₃)₂ |
| 113 | m-C₆H₄OH | do | CH₃ | m-C₆H₄OCH₃ | 5-OH |
| 114 | p-C₆H₄OC₂H₅ | COC₂H₅ | C₂H₅ | m-C₆H₄OC₃H₇ | 7-OH |
| 115 | o-C₆H₄Cl | COCH₃ | Same | o-C₆H₄CH₃ | 7-N(CH₃)₂ |
| 116 | m-C₆H₄N(C₃H₇)₂ | Same | C₆H₅ | m-C₆H₄C₂H₅ | 7-CN |
| 117 | p-C₆H₄Cl | COC₃H₇ | CH₃ | p-C₆H₄C₄H₉ | 5-CN |
| 118 | o-C₆H₄SC₃H₇ | COC₆H₅ | Same | o-C₆H₄N(C₄H₉)₂ | 7-NO₂ |
| 119 | p-C₆H₄C₃H₇ | Same | C₆H₅ | m-C₆H₄CN | 6-NO₂ |
| 120 | m-C₆H₄C₂H₅ | COC₂H₃ | Same | m-C₆H₄SC₂H₅ | 5-NO₂ |
| 121 | o-C₆H₄CH₃ | COCH₃ | do | p-C₆H₄Cl | 5-SCH₃ |

The novel compounds of the present invention are useful alone or in combination with other materials in any activity exhibited by the compounds. Thus, among numerous and varied applications may be mentioned photochromic sunglasses, variable transparency windows, novelty jewelry and toys, memory devices, photography, photocopying, optical masks, photochromic printing paper, and the like.

The compounds may be used alone in solid phase or in solution. Furthermore, they may be incorporated as a dispersed solid or as a solution in plastic moldings, castings, films or coatings on a wide variety of substances including glass, paper, wood and the like.

Films containing the compounds of this invention are particularly useful. For example, the compound may be dissolved in a suitable solvent such as benzene or acetone and the like, and a solution prepared containing the photochromic compound and a thermoplastic polymer, e.g., a 20% by weight solids solution, based on dry weight of additives, with polymethylmethacrylate (95% polymer and 5% photochromic compound). This solution is then spread on a substrate such as polyester film in a conventional manner and the thus-coated material used as optical masks, memory tapes, etc.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

SYNTHESIS A

Example 1

Preparation of 1,4-diphenyl-1-hydroxy-9-oxo-2,2,3-[1H]-xanthenetricarbonitrile

Part (a):

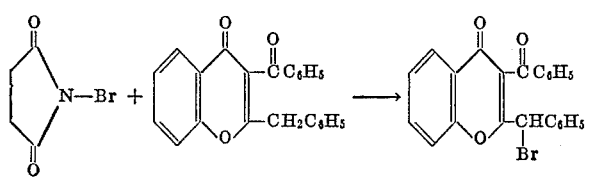

A mixture of 0.34 part of 3-benzoyl-2-benzylchromone and 0.18 parts of N-bromosuccinimide in 15 parts by volume of carbon tetrachloride was refluxed for 4 hours while irradiating with a 150-watt Hanovia medium pressure mercury ultraviolet lamp. After filtering, the solution was evaporated and the resulting yellow oil crystallized from ether-petroleum ether to give 0.30 part (71%) of yellow prisms, melting point 121.5–124.5° C.

*Analysis.*—Calcd. for $C_{23}H_{15}O_3Br$ (percent): C, 65.86; H, 3.60; Br, 19.05. Found (percent): C, 65.89; H, 3.42; Br, 19.29. Name: 3-benzoyl-2-(α-bromobenzyl)chromone.

Part (b):

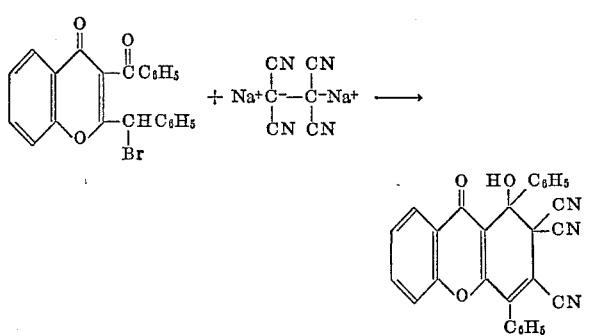

A suspension of 0.05 part of 50% sodium hydroxide dispersion in 5 parts by volume dry tetrahydrofuran was stirred in an ice bath while a solution of 0.05 parts tetracyanoethane [W. J. Middleton et al., J. Am. Chem. Soc. 80, 2783 (1958)], in 5 parts by volume tetrahydrofuran was added. After 10 minutes a solution of 0.14 parts of 3-benzoyl-2(α - bromobenzyl)chromone (prepared as in Part (a) above) was added and the mixture was stirred at room temperature for 2 hours and then at reflux for 1 hour.

The resulting purple solution was evaporated to dryness and the residue was dissolved in 50% aqueous acetic acid, treated with a few drops of 6 N HCl and diluted further with water. The reddish solid was filtered off, washed with water and recrystallized twice from methylene chloride-petroleum ether to give faintly red crystals, melting point 190–193° C. (decomposition). The yield was 10%. The product was spectrally identical with 1,4-diphenyl-1-hydroxy-9-oxo-2,2,3[1H]-xanthenetricarbonitrile.

SYNTHESIS B

Example 2

Preparation of 1-phenyl-4-(p-methoxyphenyl)-1-hydroxy-9-oxo-2,2,3[1H]-xanthenetricarbonitrile

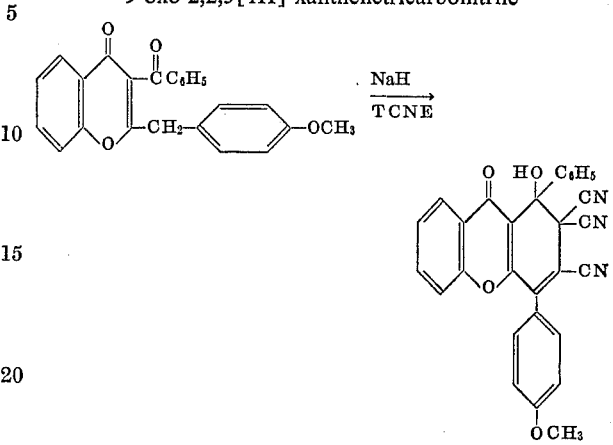

Condensation of 3 - benzoyl-2(p-methoxybenzyl)chromone with tetracyanoethylene (TCNE) substantially according to the procedure of Example 9(a) below gave the corresponding 9-oxo-xanthene in 72% yield as yellow crystals, melting point 205–207° C. (decomposition).

*Analysis.*—Calcd. for $C_{29}H_{17}N_3O_4$ (percent): C, 73.88; H, 3.63; N, 8.91. Found (percent): C, 73.88; H, 3.40; N, 9.10.

Example 3

Preparation of 1-(p-nitrophenyl)-4-phenyl-1-hydroxy-9-oxo-2,2,3[1H]-xanthenetricarbonitrile

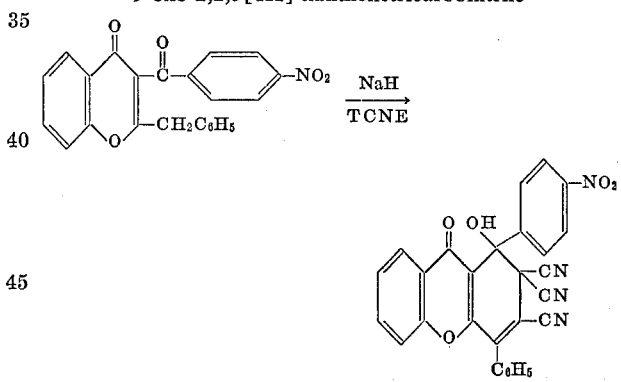

The procedure of Example 9(a) below substantially applied to 2-benzyl-3-(p-nitrobenzoyl)chromone gave a 41% yield of the 9-oxo-xanthene as an orange solid, melting point >275° C. (decomposition).

*Analysis.*—Calcd. for $C_{28}H_{14}N_4O_5$ (percent): C, 69.13; H, 2.90; N, 11.52. Found (percent): C, 69.19; H, 3.20; N, 12.03.

Example 4

Preparation of 1-p-cyanophenyl)-4-phenyl-1-hydroxy-9-oxo-2,2,3[1H]-xanthenetricarbonitrile

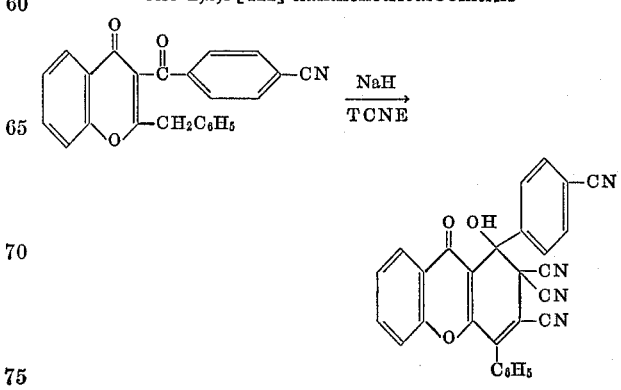

2-benzyl-3-(p-cyanobenzoyl)chromone, prepared substantially according to the procedure of Example 9(a) below, yielded the corresponding 9-oxo-xanthene as golden yellow crystals, melting point 235–237° C. (decomposition). The yield was 71%.

*Analysis.*—Calcd. for $C_{29}H_{14}N_4O_3$ (percent): C, 74.67; H, 3.02; N, 12.01. Found (percent): C, 74.43; H, 3.22; N, 12.11.

Example 5

Preparation of 1,4-diphenyl-1-hydroxy-10-methyl-9-oxo-2,2,3[1H]-acridantricarbonitrile

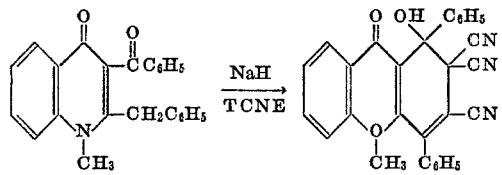

A solution of 1.17 parts of 3-benzoyl-2-benzyl-1-methyl-4(1H)-quinolone in 25 parts by volume dry tetrahydrofuran (prepared by stirring the mixture under nitrogen for 30 minutes) was added dropwise to a stirred suspension of 0.32 pat of 50% sodium hydride dispersion in 10 parts by volume of tetrahydrofuran under nitrogen. The mixture was warmed slightly at the beginning of the addition to initiate the reaction and then refluxed for 5 minutes after the addition was complete. The resulting deep red solution was cooled and 0.45 part of tetracyanoethylene (TCNE) was added. Stirring was continued for 1 hour at room temperature and 1½ hours at reflux.

The excess sodium hydride was decomposed by the addition of wet tetrahydrofuran and the solution was evaporated to give a black residue which was dissolved in water. The aqueous solution was washed twice with 2:1 ether-chloroform mixture and then acidified to pH 2 with 6 N HCl. After saturating the solution with sodium chloride it was extracted several times with chloroform. The dried extracts were evaporated and the residue was triturated with ether to give 1.24 parts of brown solid, melting point >170° C. (decomposition). Crystallization from methylene chloride-petroleum ether gave a first crop which was recrystallized from the same solvent mixture to yield 0.30 part (20%) of golden yellow crystals, melting point >210° C. (decomposition).

*Analysis.*—Calcd. for $C_{29}H_{18}N_4O_2 \cdot CH_2Cl_2$ (percent): C, 66.80; H, 3.73; N, 10.39. Found (percent): C, 66.23; H, 3.91; N, 10.44.

Example 6

Part (a).—Preparation of 1,4-diphenyl-1-hydroxy-2,2,3[1H]-dibenzofurantricarbonitrile

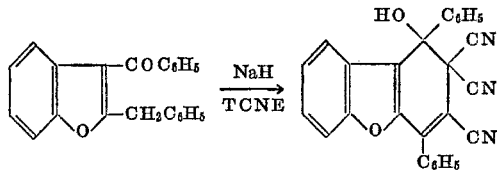

The procedure of Example 9(a) below when applied to 3-benzoyl-2-benzylbenzofuran gave a 57% yield of the dibenzofuran as light brown crystals, melting point 187.5–188.5° C. (decomposition).

*Analysis.*—Calcd. for $C_{27}H_{15}N_3O_2$ (percent): C, 78.44; H, 3.66; N, 10.16. Found (percent): C, 78.41; H, 3.69; N, 10.21.

Part (b).—Preparation of 1,4-diphenyl-1-hydroxy-2,2,3-[1H]-dibenzofurantricarbonitrile acetate

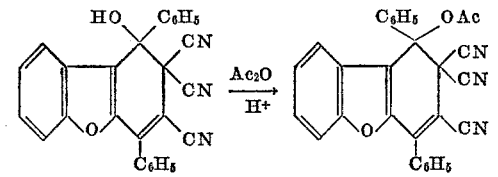

A solution of 0.90 part of the product of 6(a) above in 60 parts by volume of acetic anhydride ($Ac_2O$) was treated with 3 drops of concentrated sulfuric acid and kept at room temperature for 3 hours. Thereafter, the solution was poured into ice water. The crystalline acetate was obtained after stirring the mixture for a few minutes. The yield was 0.96 part (97%), melting point 216.5–218.5° C. (decomposition). Recrystallization from methylene chloride-petroleum ether raised the melting point of 225.5–226.5° C. (decomposition).

*Analysis.*—Calcd. for $C_{29}H_{17}N_3O_3$ (percent): C, 76.47; H, 3.76; N, 9.23. Found (percent): C, 76.36; H, 3.84; N, 9.03.

Example 7

Preparation of 1,4-diphenyl-1-hydroxy-2,2,3[1H]-dibenzothiophenetricarbonitrile

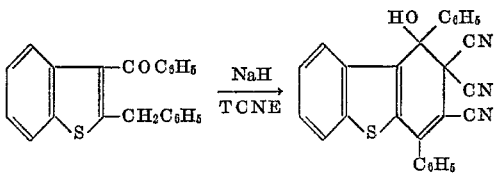

The procedure of Example 9(a) below when applied to 0.60 part of 3-benzoyl-2-benzylbenzothiophene gave the adduct as pale yellow crystals from a methylene chloride-ether-petroleum ether mixture, melting point 193–196° C. (decomposition). The yield was <5%.

*Analysis.*—Calcd. for $C_{29}H_{15}N_3OS \cdot C_4H_{10}O$ (ether solvate) (percent): C, 73.94; H, 5.00; S, 6.35. Found (percent): C, 73.55; H, 4.87; S, 6.28.

Example 8

Part (a).—Preparation of 1,4-diphenyl-1-hydroxy-9-oxo-2,2[1H]-xanthenedicarbonitrile

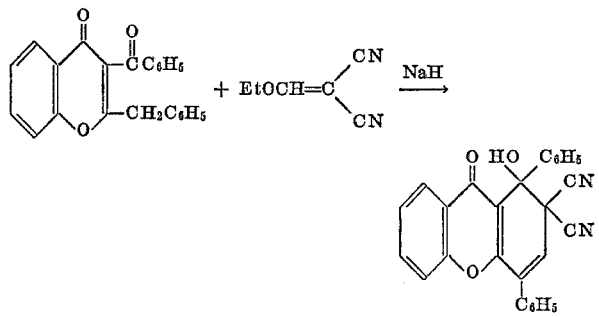

To a stirred mixture of 0.56 part of 50% sodium hydride in mineral oil and 20 parts by volume of freshly distilled tetrahydrofuran was added dropwise under nitrogen a solution of 2.0 parts of 3-benzoyl-2-benzylchromone in 25 parts by volume of tetrahydrofuran. After refluxing the dark red mixture for ½ hour, a solution of 3.54 parts of ethoxymethylenemalononitrile in 30 parts by volume of tetrahydrofuran was added dropwise to the stirred mixture. The red solution was refluxed for 4 hours.

The solvent was evaporated, and the red oil was taken up in water and the mixture washed with ether. The aqueous layer was then acidified with concentrated HCl and extracted with chloroform. The chloroform layer was washed with water, dried over anhydrous $MgSO_4$ and evaporated. The resulting dark red gum was triturated with hot ethanol. After cooling and filtering, 1.9 parts of product was obtained. The solid recrystallized from methylene-chloride-petroleum ether and washed with ether to yield a cream-white crystalline solid, melting point 175.5–177° C. (decomposition) for a yield of 1.20 parts (49%).

*Analysis.*—Calcd. for $C_{27}H_{16}O_3N_2$ (percent): C, 77.87; H, 3.87; N, 6.73. Found (percent): C, 77.61, 78.40; H, 3.69, 4.21; N, 7.53, 6.83.

Part (b).—Preparation of 1,4-diphenyl-1-hydroxy-9-oxo-2,2[1H]-xanthenedicarbonitrile acetate

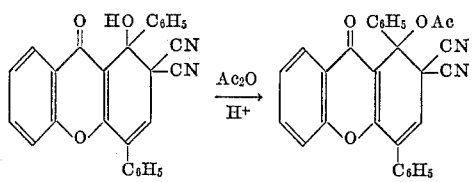

100 parts of concentrated sulfuric acid was added to a solution of 100 parts of 1,4-diphenyl-1-hydroxy-9-oxo-2,2[1H]-xanthenedicarbonitrile in the least amount of acetic anhydride required to dissolve the nitrile. After standing for 2 hours, the resulting red solution was poured into ice and allowed to stand about 1 hour with occasional stirring. The resulting solid was filtered, washed with water, and recrystallized from ethanol-water from which 75 parts (68%) of pale-yellow solid was obtained; melting point 184–185° C. (decomposition).

Analysis.—Calcd. for $C_{29}H_{18}O_4N_2$ (percent): C, 75.97; H, 3.96; N, 6.11. Found (percent): C, 75.83; H, 4.04; N, 6.27.

Example 9

Part (a).—Preparation of 1,4-diphenyl-1-hydroxy-9-oxo-2,2,3[1H]-xanthenetricarbonitrile

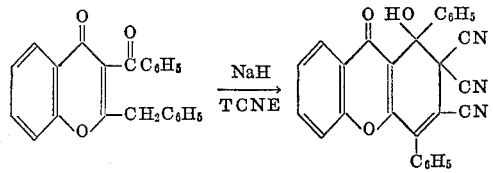

A suspension of 0.75 part of 50% sodium hydride dispersion in 25 parts by volume dry tetrahydrofuran (distilled from $LiAlH_4$) was stirred under nitrogen and treated dropwise with a solution of 3.4 parts of 3-benzoyl-2-benzylchromone in 25 parts by volume tetrahydrofuran. After the addition the resulting deep red solution was refluxed for 5 minutes, cooled to room temperature and then treated dropwise with 1.3 parts of tetracyanoethylene (TCNE) in 10 parts by volume tetrahydrofuran. The resulting purple solution was refluxed with stirring for 1.5 hours and cooled. The reaction mixture was then stirred with a small amount of ethanol to destroy any excess sodium hydride, after which it was evaporated to dryness. The resulting gummy residue was dissolved in ice water, washed once with ether to remove mineral oil and acidified with 6 N HCl. The aqueous mixture was extracted four times with chloroform. The dried extracts upon evaporation gave a dark solid. Trituration with ether-petroleum ether afforded 3.7 parts (84%) of the 9-oxo-xanthene as a brown solid, melting point 191–194° C. (decomposition). One recrystallization from methylene chloride-petroleum ether raised the melting point to 196–197.5° C. (decomposition).

Part (b).—Preparation of 1,4-diphenyl-1-hydroxy-9-oxo-2,2,3[1H]-xanthenetricarbonitrile acetate

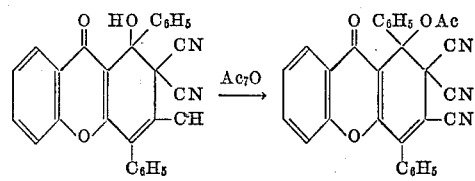

A solution of 1.0 part of the hydroxy compound of 9(a) above in 40 parts by volume of acetic anhydride was treated with 0.1 part by volume of concentrated $H_2SO_4$. After 1½ hours the solution was poured into ice water. The acetate crystallized on prolonged stirring and with some scratching. Recrystallization from benzene-hexane gave 1.04 parts (95%) of tan crystals, melting point 204–207° C. (decomposition). A small sample was recrystallized again from benzene-hexane and once from methanol to give pale yellow crystals, melting point 208–210° C. (decomposition).

Analysis.—Calcd. for $C_{30}H_{17}N_3O_4$ (percent): C, 74.53; H, 3.54; N, 8.69. Found (percent): C, 74.61; H, 3.68; N, 8.44.

SYNTHESIS C

Example 10

Part (a).—Photoaddition of tetracyanoethylene to 3-benzoyl-2-benzylchromone

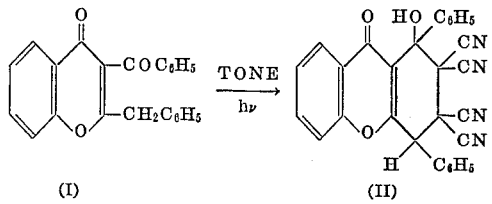

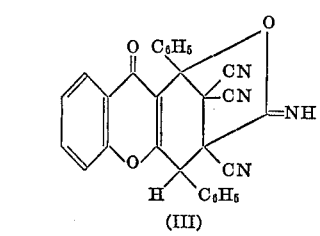

A stirred solution of 1.13 parts of the chromone (I) and 0.45 part of tetracyanoethylene (TCNE) in 40 parts by volume of ethyl acetate under nitrogen was irradiated in a water-jacked quartz vessel for 24 hours with a 1000 watt high pressure mercury arc fitted with a 250–370 millimicron band-pass filter. The solvent was evaporated at 30° C. in vacuo and the adduct (III) was crystallized from ether over a period of three days. The yield was 1.15 parts (74%), melting point 215–217° C. (decomposition). Recrystallization from methylene chloride-petroleum ether gave tan crystals, melting point 219–221° C. (decomposition).

Analysis.—Calcd. for $C_{29}H_{16}N_4O_3$ (percent): C, 74.35; H, 3.44; N, 11.96. Found (percent): C, 74.01, 74.29; H, 3.18, 3.77; N, 12.11.

In another run a mixture of the above product (III) and the uncyclized TCNE adduct (II) was obtained by fractional crystallization from ethanol. The latter product (II) had a melting point of 144–146° C. (red melt).

Analysis.—Calcd. for $C_{29}H_{16}N_4O_3 \cdot C_2H_5OH$ (ethanol solvate) (percent): C, 72.36; H, 4.31; N, 10.89. Found (percent): C, 72.17; H, 4.11; N, 11.18.

Part (b).—Preparation of 1,4-diphenyl-1-hydroxy-9-oxo-2,2,3[1H]-xanthenetricarbonitrile

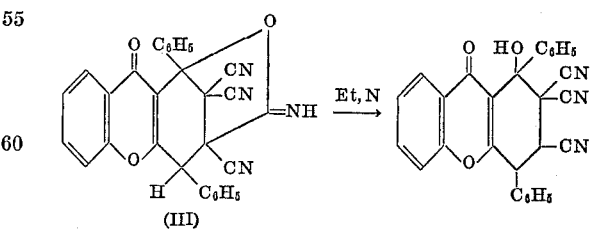

A suspension of 0.25 part of the 3-benzoyl-2-benzylchromone-TCNE photoadduct (III) in 50 parts by volume of benzene was treated with 0.25 part of triethylamine ($Et_3N$) and refluxed under nitrogen for 2 hours. On shaking the resulting deep purple solution with 25 parts by volume of 5 N HCl, the color faded. The organic layer was then separated and dried. The solution was concentrated and diluted with petroleum ether to precipitate a tan solid, melting point 190–192° C. (decomposition). Recrystallization from the ether-petroleum ether gave light brown crystals, melting point 196–198° C. (decomposition).

*Analysis.*—Calcd. for $C_{28}H_{15}N_3O_3$ (percent): C, 76.18; H, 3.43; N, 9.52. Found (percent): C, 76.04; H, 3.60; N, 9.49.

Part (c).—Preparation of 1,4-diphenyl-1-hydroxy-9-oxo-2,2,3-[1H]-xanthenetricarbonitrile

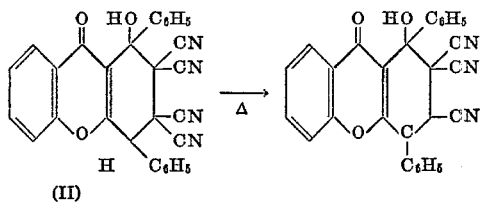

An ethanolic solution of 0.50 part of the crude photoadduct (II) was refluxed for an hour under nitrogen and filtered. The resulting deep red solution was evaporated. The residue crystallized upon addition of a small amount of ether. Recrystallization from benzene-hexane gave the 9-oxo-xanthene, melting point 196–197.5° C. (decomposition).

Example 11

Part (a).—Photoaddition of tetracyanoethylene to 2-benzoyl-3-benzylbenzofuran

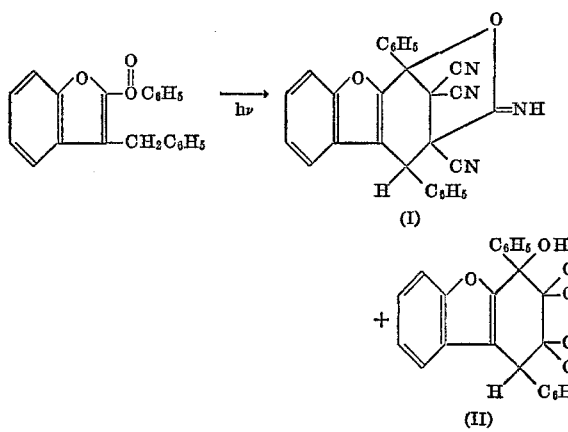

In a water-cooled quartz vessel, a stirred solution of 0.31 part of 2-benzoyl-3-benzylbenzofuran and 0.13 part of tetracyanoethylene in 15 parts by volume of ethyl acetate, said solution being under nitrogen, was irradiated with a 1000 watt mercury arc fitted with a 250–370-millimicron band-pass filter. After 7 hours the solution was evaporated to dryness and the residue crystallized from ether-petroleum ether to give 0.34 part (77%) of the photoadduct (I), melting point 176–180° C. (decomposition). Adduct (II) was present in only trace amounts. Two recrystallizations from methylene chloride-petroleum ether afforded pale yellow crystals, melting point 187.5–189.5° C. (decomposition).

*Analysis.*—Calcd. for $C_{28}H_{16}N_4O_2$ (percent): C, 76.36; H, 3.66; N, 12.72. Found (percent): C, 75.83; H, 3.67; N, 12.77.

Part (b).—Preparation of 1,4-diphenyl-4-hydroxy-2,3,3[4H]-dibenzofurantricarbonitrile

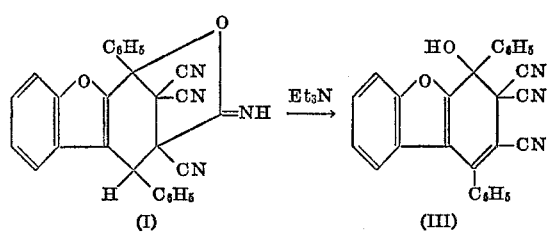

A solution of 0.27 part of the 2-benzoyl-3-benzylbenzofuran-TCNE photoadduct (I) in 10 parts by volume tetrahydrofuran was treated with 0.1 part of triethylamine and allowed to stand for 18 hours. The resulting purple gum was partitioned between ether and 5 N HCl acid, causing the color to fade. The ether layer was separated and the aqueous layer was extracted twice more with ether. The dried extracts afforded a crystalline residue upon evaporation. Two recrystallizations from ether-petroleum ether gave the benzofuran, (III), as colorless crystals, melting point 108.5–110.5° C. (decomposition). The yield was 0.18 part (60%).

*Analysis.*—Calcd. for $C_{27}H_{15}N_3O_2 \cdot C_4H_{10}O$ (ether solvate) (percent): C, 76.37; H, 5.17; N, 8.62. Found (percent): C, 76.60; H, 4.99; N, 8.91, 8.59.

Part (c).—Preparation of 1,4-diphenyl-4-hydroxy-2,3,3[4H]-dibenzofurantricarbonitrile acetate

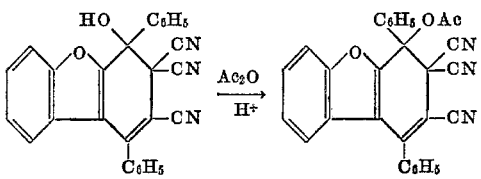

1,4-diphenyl-4-hydroxy-2,3,3[4H]-benzofurantricarbonitrile (0.085 parts) and 0.1 part of concentrated sulfuric acid were mixed in 5 parts by volume of acetic anhydride. After an hour the solution was poured into ice water and the crystalline acetate was filtered off. The yield was 0.08 part (100%), melting point 218–221° C. (decomposition). Recrystallization from methylene chloride-petroleum ether gave colorless crystals, melting point 225–227° C. (decomposition).

*Analysis.*—Calcd. for $C_{29}H_{17}N_3O_3$ (percent): C, 76.47; H, 3.76; N, 9.23. Found (percent): C, 75.85; H, 3.94; N, 9.64.

Examples 12–16

The following compounds are prepared substantially in accordance with the procedure of Examples 1–11 above except for the starting materials which contain moieties corresponding to the values for M set forth in the general formula for the compounds of this invention hereinabove.

Example 12

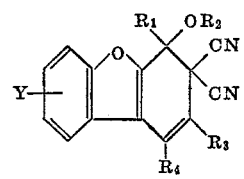

$R_1=C_6H_5$, $R_2=COC_6H_5$, $R_3=H$, $R_4=C_6H_5$, $Y=H$ 1,4-diphenyl-4-hydroxy-3,3[4H]-dibenzofurandicarbonitrile benzoate.

Example 13

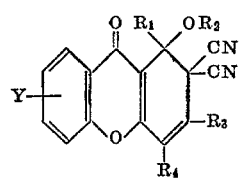

$R_1=p-C_6H_5$, $R_2=COCH_3$, $R_3=COCH$, $R_3=H$
$R_4=C_6H_5$, $Y=6-N(CH_3)_2$ 1,4-diphenyl-6-dimethylamino-1-hydroxy-9-oxo-2,2[1H]-xanthenedicarbonitrile acetate.

Example 14

1-(p-cyanophenyl)-4-phenyl-1-hydroxy-9-oxo-2,2,3[1H]-xanthenetricarbonitrile acetate.

Example 15

1-(p-nitrophenyl)-4-phenyl-1-hydroxy-9-oxo-2,2,3[1H]-xanthenetricarbonitrile acetate.

Example 16

1 - phenyl - 4 - (p-methoxyphenyl)-1-hydroxy-9-oxo-2,2,3[1H]-xanthenetricarbonitrile acetate.

Example 17

1,4 - diphenyl - 1 - hydroxy-10-benzyl-9-oxo-2,2,3[1H] acridantricarbonitrile is prepared substantially in accordance with the procedure of Example 5.

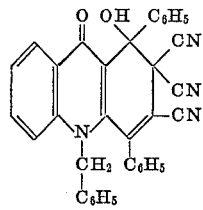

We claim:
1. A cyclohexadiene compound of the formula

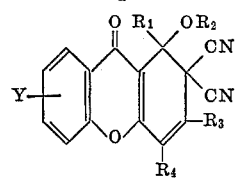

wherein $R_1$ and $R_4$ are selected from the group consisting of phenyl and substituted phenyl, said substituents for phenyl being selected from the group consisting of hydroxy, lower alkyl, lower alkoxy, lower alkyl thio, cyano, nitro, di(lower alkyl)amino, halogen and trifluoromethyl; $R_2$ is selected from the group consisting of hydrogen, lower alkanoyl, and benzoyl; $R_3$ is selected from the group consisting of hydrogen, cyano, phenyl and lower alkyl; and Y is selected from the group consisting of hydrogen, hydroxy, lower alkyl, trifluoromethyl, lower alkoxy, lower alkyl thio, cyano, nitro, halogen, di(lower alkyl)amino, phenyl and lower alkyl-substituted phenyl.

2. 1,4 - diphenyl - 1 - hydroxy-9-oxo-2,2,3[1H]-xanthenetricarbonitrile.

3. 1,4 - diphenyl - 1 - hydroxy-9-oxo-2,2,3[1H]-xanthenetricarbonitrile acetate.

4. 1,4 - diphenyl - 1 - hydroxy-9-oxo-2,2[1H]-xanthenedicarbonitrile acetate.

5. 1 - (p-cyanophenyl) - 4 - phenyl-1-hydroxy-9-oxo-2,2,3[1H]-xanthenetricarbonitrile.

References Cited

Chemical Abstracts, vol. 47 (1953), p. 2160.

NORMA S. MILESTONE, Primary Examiner

U.S. Cl. X.R.

117—161, 138.8; 260—294.9, 328, 329.3, 345.2, 346.2; 204—158